United States Patent
Adl-Tabatabai et al.

(10) Patent No.: US 9,274,855 B2
(45) Date of Patent: Mar. 1, 2016

(54) OPTIMIZATION FOR SAFE ELIMINATION OF WEAK ATOMICITY OVERHEAD

(75) Inventors: Ali-Reza Adl-Tabatabai, San Jose, CA (US); Tatiana Shpeisman, Menlo Park, CA (US); Vijay Menon, Seattle, WA (US)

(73) Assignee: Intel Corporation, Santa Clara, CA (US)

(*) Notice: Subject to any disclaimer, the term of this patent is extended or adjusted under 35 U.S.C. 154(b) by 1107 days.

(21) Appl. No.: 12/344,147

(22) Filed: Dec. 24, 2008

(65) Prior Publication Data

US 2010/0162250 A1 Jun. 24, 2010

(51) Int. Cl.
G06F 9/44 (2006.01)
G06F 13/00 (2006.01)
G06F 9/52 (2006.01)
G06F 9/46 (2006.01)
G06F 12/08 (2006.01)
G06F 12/10 (2006.01)

(52) U.S. Cl.
CPC .......... G06F 9/52 (2013.01); G06F 9/466 (2013.01); G06F 12/0897 (2013.01); G06F 12/1027 (2013.01)

(58) Field of Classification Search
CPC ............................ G06F 9/30087; G06F 9/466
See application file for complete search history.

(56) References Cited

U.S. PATENT DOCUMENTS

| | | | |
|---|---|---|---|
| 5,950,228 A * | 9/1999 | Scales et al. | 711/148 |
| 7,870,545 B2 * | 1/2011 | Saha et al. | 717/159 |
| 2002/0083056 A1 * | 6/2002 | Armstrong et al. | 707/8 |
| 2004/0044739 A1 | 3/2004 | Ziegler | |
| 2008/0025607 A1 | 1/2008 | Lev et al. | |
| 2008/0256073 A1 | 10/2008 | Detlefs et al. | |
| 2009/0138890 A1 * | 5/2009 | Blake et al. | 718/106 |
| 2010/0162249 A1 | 6/2010 | Shpeisman et al. | |
| 2011/0271017 A1 * | 11/2011 | Shpeisman et al. | 710/53 |

OTHER PUBLICATIONS

Chuang et al., Unbounded Page-Based Transactional Memory, Oct. 2006, ACM.*
Kumar et al., Hybrid Transactional Memory, Mar. 2006, ACM.*
Dwarkadas, Hardware Support for Transactional Memory, Aug. 15, 2006, URCS.*
Office Action from related U.S. Appl. No. 12/344,144 mailed Feb. 28, 2012.
Office Action from related U.S. Appl. No. 12/344,144 mailed Sep. 7, 2012.

(Continued)

*Primary Examiner* — Hyun Nam
(74) *Attorney, Agent, or Firm* — Grossman, Tucker, Perreault & Pfleger, PLLC

(57) ABSTRACT

A method and apparatus for optimizing weak atomicity overhead is herein described. A state table is maintained either during static or dynamic compilation of code to track data non-transactionally accessed. Within execution of a transaction, such as at transactional memory accesses or within a commit function, it is determined if data associated with memory access within the transaction is to be conflictingly accessed outside the transaction from the state table. If the data is not accessed outside the transaction, then the transaction potentially commits without weak atomicity safety mechanisms, such as privatization. Furthermore, even if data is accessed outside the transaction, optimized safety mechanisms may be performed to ensure isolation between the potentially conflicting accesses, while eliding the mechanisms for data not accessed outside the transaction.

27 Claims, 6 Drawing Sheets

(56) References Cited

OTHER PUBLICATIONS

Office Action from related U.S. Appl. No. 12/344,144 mailed Sep. 20, 2013.
Office Action from related U.S. Appl. No. 12/344,144 mailed May 13, 2014.
Office Action from related U.S. Appl. No. 12/344,144 mailed Jan. 14, 2015.
Office Action from related U.S. Appl. No. 12/344,144 mailed Jul. 14, 2015.
Ramadan et al., "Dependence-aware transactional memory for increased concurrency"; Department of Computer Sciences, University of Texas at Austin, Nov. 2008.
Menon et al., "Towards a Lock-based Semantics for Java STM", Nov. 1, 2007, University of Washington Technical Report, pp. 1-13.

* cited by examiner

OPTIMIZATION FOR SAFE ELIMINATION OF WEAK ATOMICITY OVERHEAD

FIELD

This invention relates to the field of processor execution and, in particular, to execution of groups of instructions.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be concurrently executed. However, the increase in the number of software threads that may be executed simultaneously have created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. Either way, after extrapolating this simple example into a large scalable program, it is apparent that the complexity of lock contention, serialization, fine-grain synchronization, and deadlock avoidance become extremely cumbersome burdens for programmers.

Another recent data synchronization technique includes the use of transactional memory (TM). Often transactional execution includes executing a grouping of a plurality of micro-operations, operations, or instructions. In the example above, both threads execute within the hash table, and their memory accesses are monitored/tracked. If both threads access/alter the same entry, conflict resolution may be performed to ensure data validity. One type of transactional execution includes a Software Transactional Memory (STM), where tracking of memory accesses, conflict resolution, abort tasks, and other transactional tasks are performed in software.

In strongly atomic transactional memory systems, to ensure runtime conflicts between transactional memory operations and non-transactional memory operations do not occur, compilers treat each non-transactional memory operation as a single operation transaction. In other words, transactional barriers are inserted at non-transactional memory accesses to isolate transactions from these non-transactional memory accesses. Here, the potential incorrect execution due to conflicts between transactional and non-transactional accesses is avoided; yet, execution of transactional barriers at every non-transactional memory operation potentially wastes execution cycles.

In contrast, in weakly atomic transactional memory systems, only transactional accesses are isolated from each other. In such systems non-transactional memory accesses are not tracked and, thus, do not incur any additional transactional overhead. However, weakly atomic systems do not provide general isolation and ordering guarantees for programs that mix transactional and non-transactional accesses to the same data which may potentially lead, in some cases, to incorrect execution as a result of conflicting transactional and non-transactional accesses that are not isolated from one another.

Usually, weakly atomic systems are augmented with additional mechanisms that enforce proper ordering between transactions and non-transactional memory accesses. As an example, often weakly atomic optimistic software transactional memory systems utilize a global synchronization technique called quiescence, which delays transaction commit until all preceding transactions are stable to enforce ordering between accesses. In a pessimistic concurrency system, quiescence may not be used, yet, scaling in a pessimistic system is often very difficult.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific hardware/software support for transactional execution, specific shared memory access tracking, specific locking/versioning/meta-data methods, specific types of local/memory in processors, and specific types of memory accesses and locations, etc. in order to provide a thorough understanding of the present invention. It will be apparent, however, to one skilled in the art that these specific details need not be employed to practice the present invention. In other instances, well known components or methods, such as coding of transactions in software, demarcation of transactions, specific and alternative multi-core and multi-threaded processor architectures, transaction hardware, cache organizations, specific compiler methods/implementations, and specific operational details of microprocessors, have not been described in detail in order to avoid unnecessarily obscuring the present invention.

The method and apparatus described herein are for optimizing safety mechanisms in weakly atomic transactional memory systems. Specifically, optimizing safety mechanisms is primarily discussed in reference to an illustrative optimistic concurrency control Software Transactional Memory system (STM). In fact, specific reference is made to a version of optimizing privatization safety for an optimistic concurrency control write-buffering STM, such as in reference to FIG. 6 below. However, the methods and apparatus for optimizing safety mechanisms for weakly atomic transactional memory systems are not so limited, as they may be implemented in any transactional memory system, such as a an update-in-place STM within a managed or native execution environment.

Figure 1:
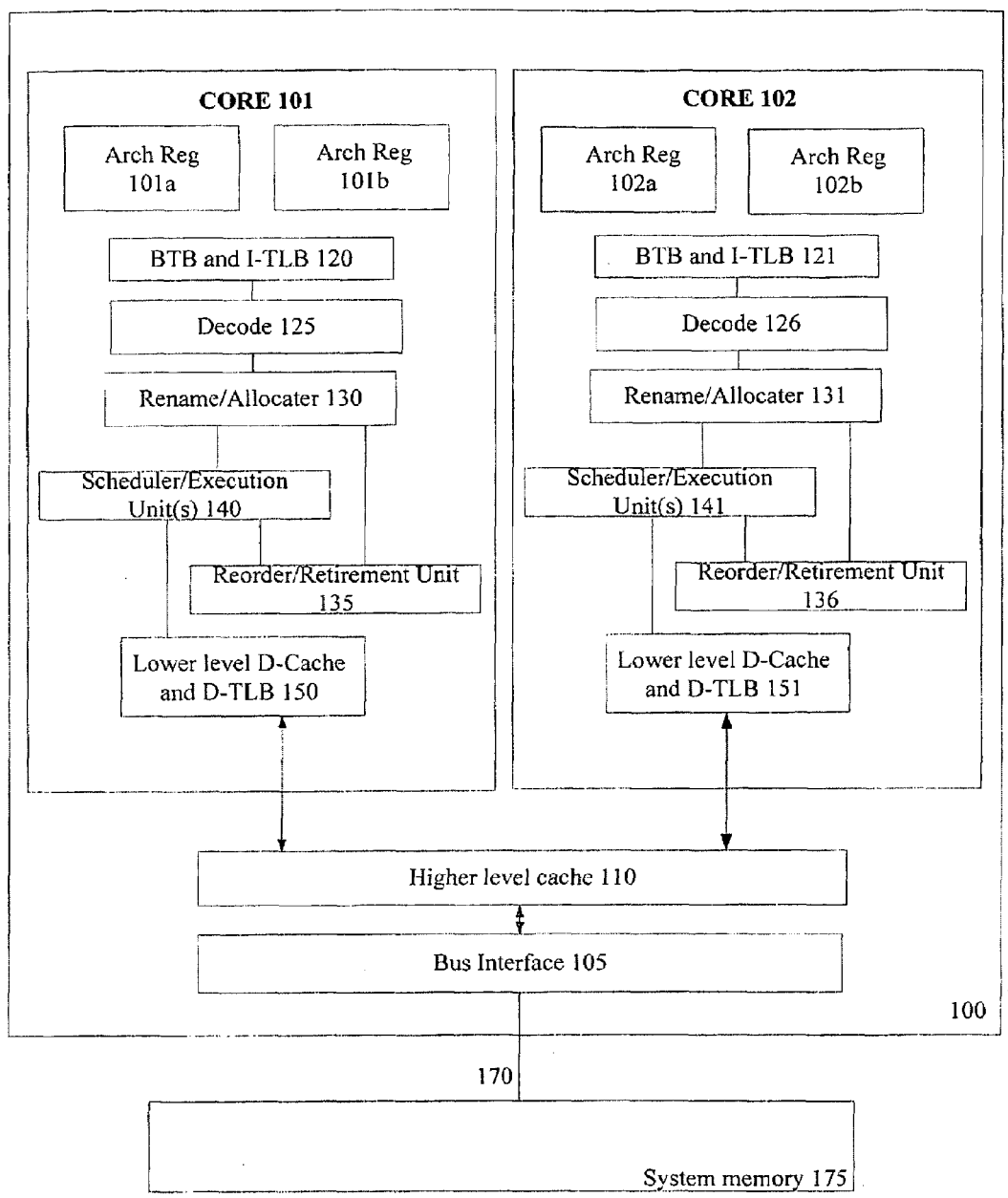
FIG. 1 illustrates an embodiment of a processor including multiple processing elements capable of executing multiple software threads.

Referring to FIG. 1, an embodiment of a processor capable of executing multiple threads concurrently is illustrated. Note, processor 100 may include hardware support for hardware transactional execution, hardware acceleration of an Software Transactional Memory (STM), or execution of a STM. Processor 100 includes any processor, such as a microprocessor, an embedded processor, a digital signal processor (DSP), a network processor, or other device to execute code. Processor 100, as illustrated, includes a plurality of processing elements.

In one embodiment, a processing element refers to a thread unit, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102, which share access to higher level cache 110. Although processor 100 may include asymmetric cores, i.e. cores with different configurations, functional units, and/or logic, symmetric cores are illustrated. As a result, core 102, which is illustrated as identical to core 101, will not be discussed in detail to avoid repetitive discussion. In addition, core 101 includes two hardware threads 101a and 101b, while core 102 includes two hardware threads 102a and 102b. Therefore, software entities, such as an operating system, potentially view processor 100 as four separate processors, i.e. four processors capable of executing four software threads.

Here, a first thread is associated with architecture state registers 101a, a second thread is associated with architecture state registers 101b, a third thread is associated with architecture state registers 102a, and a fourth thread is associated with architecture state registers 102b. As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocater logic 130 may also be replicated for threads 101a and 101b. Some resources, such as reorder buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of exemplary functional units/resources of a processor is illustrated. Note that a processor may include, or omit, any of these functional units, as well as include any known functional units, logic, or firmware not depicted.

As illustrated, processor 100 includes bus interface module 105 to communicate with devices external to processor 100, such as system memory 175, a chipset, a northbridge, or other integrated circuit. Memory 175 may be dedicated to processor 100 or shared with other devices in a system. Higher-level or further-out cache 110 is to cache recently fetched elements from higher-level cache 110. Note that higher-level or further-out refers to cache levels increasing or getting further way from the execution unit(s). In one embodiment, higher-level cache 110 is a second-level data cache. However, higher level cache 110 is not so limited, as it may be associated with or include an instruction cache. A trace cache, i.e. a type of instruction cache, may instead be coupled after decoder 125 to store recently decoded traces. Module 120 also potentially includes a branch target buffer to predict branches to be executed/taken and an instruction-translation buffer (I-TLB) to store address translation entries for instructions.

Decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages. Note the units and architecture of processor 100 are purely illustrative, as the methods and apparatus described herein may be implemented utilizing any hardware for execution.

In one embodiment, processor 100 is capable of transactional execution. A transaction, which may also be referred to as a critical or atomic section of code, includes a grouping of instructions, operations, or micro-operations to be executed as a group. For example, instructions or operations may be used to demarcate a transaction or a critical section. Typically, during execution of a transaction, updates to memory are not made globally visible to other transactions until the transaction is committed. While the transaction is still pending, locations loaded from and written to within a memory are tracked. Upon successful validation of those memory locations, the transaction is committed and updates made during the transaction are made globally visible.

However, if the transaction is invalidated during its pendancy, the transaction is restarted without making the updates globally visible. As a result, pendency of a transaction, as used herein, refers to a transaction that has begun execution and has not been committed or aborted, i.e. pending. Example implementations for transactional execution include a Hardware Transactional Memory (HTM) system, a Software Transactional Memory (STM) system, and a combination or hybrid thereof.

A Software Transactional Memory (STM) system often refers to performing access tracking, conflict resolution, or other transactional memory tasks in or at least partially in software. In one embodiment, processor 100 is capable of executing a compiler to compile program code to support transactional execution. Here, the compiler may insert operations, calls, functions, and other code to enable execution of transactions.

A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle end, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts transactional operations, calls, functions, etc. in one or more phases of compilation, such as insertion of calls/operations in a front-end phase of compilation and then transformation of the calls/operations into lower-level code during a transactional memory transformation phase.

In one embodiment, a compiler dynamically compiles code in a runtime environment, such as a Just In Time (JIT) compiler in Java™ from Sun Corporation. Often, this type of compilation is referred to as dynamic compilation, i.e. compilation during runtime. In addition, Java™ from Sun Corporation is typically referred to as managed code, i.e. an abstraction level between physical hardware and software code often referred to as a virtual machine capable of running on multiple different physical/native machines. However, dynamic compilation may also refer to partial program analysis/compilation, i.e. where the compiler does not have the entire section of code available to perform analysis during compilation. In contrast, whole program analysis or pre-compilation before runtime execution is typically referred to as static compilation. In addition to a managed environment, a compiler may also compile program code to run in a native environment, such as compilation into x86 code to be executed on Intel architecture processors.

Nevertheless, despite the execution environment and dynamic or static nature of a compiler, the compiler, in one embodiment, compiles program code to enable transactional execution. Therefore, reference to execution of program code, in one embodiment, refers to (1) execution of a compiler program(s), either dynamically or statically, to compile main program code, to maintain transactional structures, or to perform other transaction related operations, (2) execution of main program code including transactional operations/calls, (3) execution of other program code, such as libraries, associated with the main program code, or (4) a combination thereof.

To illustrate, assume a compiler, during compilation of main code, inserts memory access barrier function calls at transactional memory access operations, such as read barriers at transactional loads and write barriers at transactional stores, within program code. In addition, other calls and operations are also inserted in the main program code, such as commit calls and abort calls. In conjunction with the main program code, a library, such as a transactional runtime library, is also provided. Here, the transactional runtime library includes the read barrier, write barrier, commit, and abort functions, as well as other transactional memory related functions, such as validation functions, etc. One potential advantage of this distribution process includes the ability to update the barrier functions, commit functions, and abort functions through redistribution of a new library instead of recompilation of all the main application code.

Therefore, processor 100 executing "program code," in this example, to perform transactional memory related operations potentially includes processor 100 executing a compiler to insert/transform/compile main application code, a compiler or other code/operations to maintain transactional structures, execution of the compiled main application code, and execution of functions in a transactional runtime library. In another example, execution of program code includes execution of program code, such as a JIT compiler, to maintain transactional structures, such as a Not Accessed Outside Transaction (NAOT) state table. Yet, as stated above, reference to execution of program code may include any known code for performance of the methods described herein.

In one embodiment, processor 100 executes code, such as a JIT compiler or operations inserted in other code to determine if shared data is potentially conflictingly accessed outside a transaction. For example, processor 100 executes the code to maintain an NAOT state table to determine if shared data is not accessed outside a transaction. Note that this analysis may be performed statically during whole program analysis or dynamically during runtime.

Here, note that a potential conflict may not be equivalent to an invalidating access as commonly referred to in transactional memory; however, conflicting accesses may result in an invalidating access. In transactional memory, an invalidating access often refers to an actual invalidating access, such as actual performance of a write to a memory location that is loaded from during a pendency of a transaction. In contrast, conflicting accesses, in one embodiment discussed herein, refers to a potential for accesses to be invalidating accesses. For example, during dynamic compilation a transactional write is to access shared data, which is also to be accessed by a non-transactional read operation. However, during actual execution, the non-transactional read potentially occurs before a transaction including the transactional write begins, which does not result in an actual invalidating access. Therefore, as can be seen, these conflicting accesses exhibit a potential for being invalidating; however, when they are executed they may not be invalidating. Consequently, reference to a conflicting access or a potential conflicting access, in one embodiment, includes operations that are determined to be potentially invalidating according to the implementation, as described below.

In one embodiment, in response to determining shared data is not accessed outside a transaction, weakly atomic safety mechanisms associated with the shared data are optimized. As an example, privatization, publication, and/or granular safety mechanisms may be drastically reduced or even removed, which potentially increases execution efficiency without sacrificing safety concerns. In other words, transactional accesses are isolated from each other through the construct of transactional barriers, while the safety of transactional accesses to shared data with regard to non-transactional accesses is ensured through the determination that the shared data is not accessed outside a transaction.

As alluded to above, one example of a conflicting access include a non-transactional read of shared data that is written within a transaction in a managed write buffering STM. In an additional example, within a native buffering STM, a transactional read of shared data written outside a transaction may also be considered a potentially conflicting access. Note that these are purely exemplary illustrations of conflicting accesses, which may or may not be considered conflicting accesses in managed, unmanaged, write-buffering, or update-in-place STMs.

Figure 2:
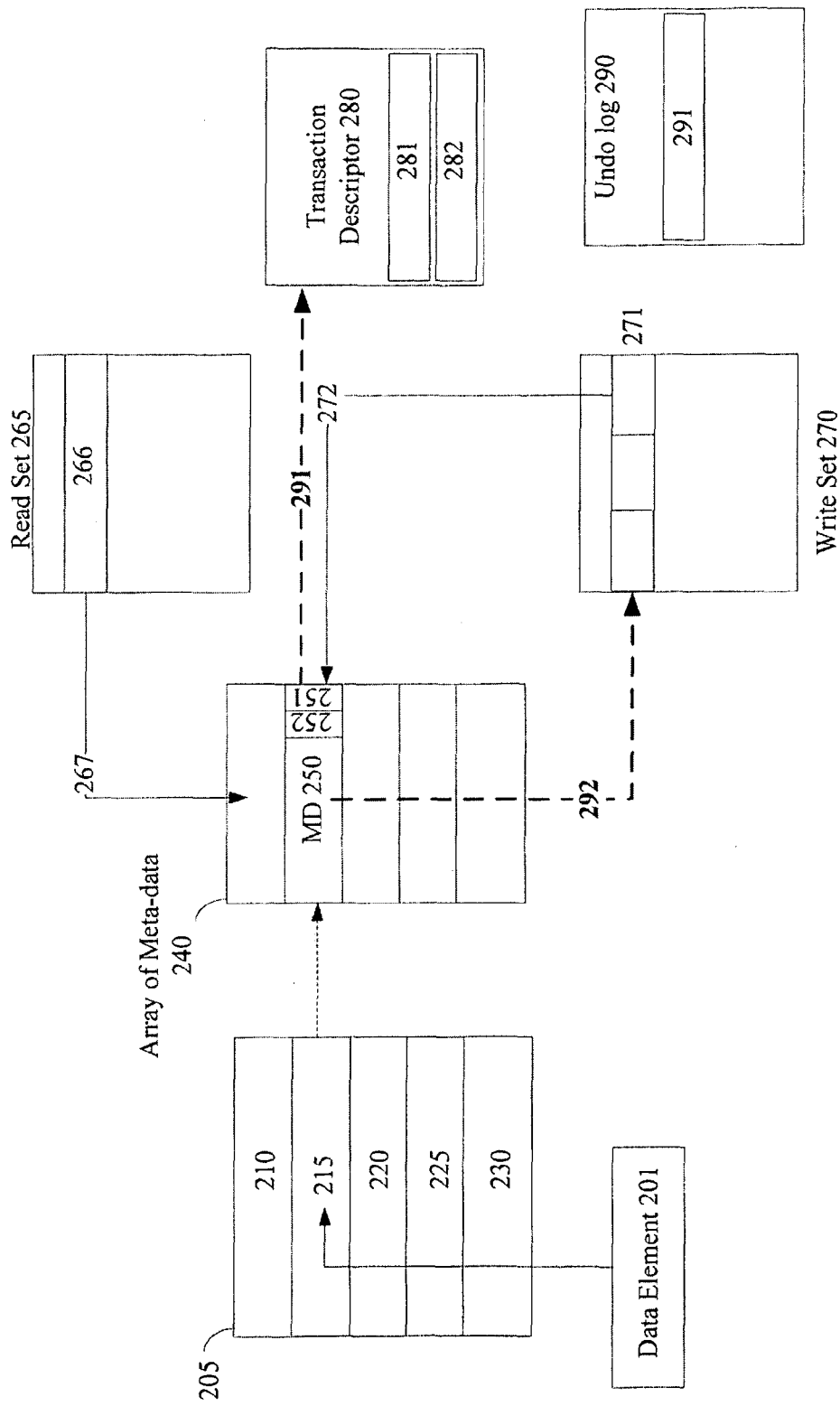
FIG. 2 illustrates an embodiment of structures to support transactional execution.

Referring to FIG. 2, a simplified illustrative embodiment of an optimistic STM system is depicted. In one embodiment of an STM, transactional barriers, such as read and write barriers, are utilized to ensure data consistency during transactional memory access operations. In other words, transactional barriers perform bookkeeping to ensure isolation and data validity between transactional accesses. In a strongly atomic system these transactional barriers are also inserted at non-transactional operations to ensure isolation and data validity between transactional and non-transactional accesses. In contrast, in a weakly atomic system, other safety mechanisms, such as a privatization safety mechanism, is utilized to ensure data consistency between non-transactional and transactional memory accesses. These safety mechanisms and transactional barriers may maintain and utilize transactional structures, such as those illustrated in FIG. 2.

In one embodiment of an STM, memory locations and/or data elements, such as data element 201 to be held in cache line 215, are associated with meta-data locations, such as meta-data location 250 in array 240. As an illustrative example, an address, or a portion thereof, associated with data element 201 and/or line 215 of cache memory 205 is hashed to index location 250 in array 240. Often, in regards to transactional memory, meta-data location 250 is referred to as a transaction record, while array 240 is referred to as an array of transaction records. Although transaction record 250, as illustrated, is associated with a single cache line, a transaction record may be provided at any data granularity level, such as a size of data element 201, which may be smaller or larger than cache line 215, as well as include an operand, an object, a class, a type, a data structure, or any other element of data.

In another embodiment, which is not depicted, alternative methods for mapping meta-data to data elements or objects are utilized. For example, data element 201 potentially includes a data object with any number of object fields. Here, meta-data, such as location 250, is held in a field of the object or a header of the object. As an example, meta-data held in a header of an object is utilized as meta-data for all the object fields within the object. Therefore, although the description of FIG. 2 primarily focuses on cache line conflict detection, the methods and apparatus described herein may be utilized in any transactional memory system, such as in an object based conflict detection system.

Often in a STM, transaction record (TR) 250 is utilized to provide different levels of ownership of and access to an associated memory address, such as data element 201. In one embodiment, TR 250 holds a first value to represent an unlocked or un-owned state and holds a second value to represent a locked or owned state. In some implementations, TR 250 may be capable of multiple different levels of locked or owned states, such as a write lock/exclusive lock state to provide exclusive ownership to a single owner, a read lock where reader(s) read data element 201 while allowing others to still read but not write data element 201, and a read lock with intent to upgrade to a write/exclusive lock state where a potential writer wants to acquire an exclusive write-lock but is waiting for current readers to release data element 201.

The values utilized to represent unlocked states and locked states in TR 250 vary based on the implementation. In one embodiment of a pessimistic concurrency control STM, TR 250 holds a bit vector, where higher order bits represent executing transactions, while LSB 251 and $2^{nd}$ LSB 252 represent a write lock state, an unlocked state, and a read with intent to upgrade to write lock state. In an unlocked state, the higher bits that are set represent corresponding transactions that have read data element 201, i.e. corresponding transactions that have shared read locks of transaction record 250. In a locked state, one of the higher bits are set to indicate which of the transactions has write locked data element 201. Here, bit 251 is utilized as an ownership indicator as discussed below.

In contrast, in one embodiment of an optimistic concurrency control STM, TR 250 holds a version or timestamp value to indicate an unlocked state and holds a reference, such as a pointer, to a transaction descriptor, such as transaction descriptor 280, to represent a locked state. Usually, transaction descriptor 280 holds information describing a transaction, such as transaction ID 281 and transaction state 282. The above described example of utilizing a pointer to transaction descriptor 280 is often referred to as a direct reference STM, where transaction record 250 holds a direct reference to owning transaction 281.

In another embodiment, an owned or locked value includes a reference to a write set entry, such as write entry 271 of write set 270. As an example, write entry 271 is to hold a logged version number from transaction record 250 before the lock is acquired, a pointer to transaction descriptor 280 to indicate that transaction 281 is associated with write entry 271, and a back pointer to transaction record 250. This example is often referred to as an indirect reference STM, where TR 250 references an owning transaction indirectly, i.e. through write entry 271.

In one embodiment, an access barrier is executed at a transactional memory access to data element 201 to ensure proper access and data validity. Here, an ownership test is often performed to determine the ownership state of TR 250. In one embodiment, a portion of TR 250, such as LSB 251 and/or $2^{nd}$ LSB 252, is utilized to indicate availability of data element 201. To illustrate, when LSB 251 holds a first value, such as a logical zero, then TR 250 is unlocked, and when LSB 251 holds a second value, such as a logical one, then TR 250 is locked. In this example, second LSB 252 may be utilized to indicate when a read owner intends to upgrade to an exclusive write lock, as discussed above with regard to a pessimistic concurrency control STM. Alternatively, the combination of bits 251-252, as well as other bits, may be utilized to encode different ownership states, such as the multiple lock states described above.

In one embodiment, barriers at transactional memory accesses perform bookkeeping in conjunction with the ownership tests described above. For example, upon a transactional read of data element 201, an ownership test is performed on TR 250. If unlocked, i.e. holding a version value in an optimistic concurrency control STM, the version value is logged in read entry 265 of read set 266. Later, upon validation, which may be on-demand during pendency of the transaction or at commit of the transaction, a current value of TR 250 is compared to the logged value in entry 266. If the values are different, then either another owner has locked TR 250 and/or modified data element 201, which results in a potential data conflict. Additionally, a write barrier may perform similar bookkeeping operations for a transactional write to data element 201, such as performing an ownership test, acquiring a lock, indicating an intent to upgrade the lock, managing write set 270, etc.

Previously, at the end of a transaction, a commit of the transaction is attempted. As an example, a read set is validated to ensure locations read from during pendency of the transaction are valid. In other words, a logged version value held in read entry 266 is compared against a current value held in transaction record 250. If the current value is the same as the logged version, then no other access has updated data element 201. Consequently, the read associated with entry 266 is determined to be valid. If all the memory accesses are determined to be valid, then the transaction is committed.

However, if the versions are different and the current transaction did not read and then write to the data element, then another transaction either acquired a lock of TR 250 and/or modified data element 201. As a result, the transaction may then be aborted. Once again, depending on the implementation of the STM, the operations performed by the commit and abort functions may be interchangeable. For example, in a write-buffering STM, writes during a pendency of the transaction are buffered, and upon commit they are copied into the corresponding memory locations. Here, when the transaction is aborted, new values in the write-buffer are discarded. Inversely, in an update-in-place STM, the new values are held in the corresponding memory locations, while the old values are logged in a write log. Here, upon abort, the old values are copied back to the memory locations, and on a commit, the old values in the write log are discarded.

In an update-in-place STM, when roll-back of updated memory locations is needed, often an undo log, such as undo log 290 is utilized. As an example, undo log 290 includes entries, such as entry 291, to track updates to memory during a transaction. To illustrate, in an update-in-place STM, memory locations are updated directly. However, upon an abort, the updates are discarded based on undo log 290. In one embodiment, undo log 290 is capable of rolling back nested transactions. Here, undo log 290 potentially rolls back a nested transaction without invalidating higher/outer level transactions, such as rolling back to a checkpoint immediately before the start of the nested transaction.

As stated above, in a weakly atomic system, these transactional barriers provide isolation between transactional accesses, while other safety mechanisms ensure validity of shared data accessed inside and outside of a transaction, such as privatization, publication, and granular safety. As an example, some weakly atomic systems utilize a form of global synchronization called quiescence. Quiescence enforces ordering between transactional and non-transactional accesses by delaying transaction commit until preceding transactions are stable. Previously, quiescence was performed at every transaction commit, i.e. each transaction must wait for other concurrent transaction, which potentially hurts scalability of an STM system. A previous alternative to quiescence, was acquiring read locks before every read within a transaction, such as in a pessimistic system. However, acquisition of read locks for every transactional read severely hurts transactional execution efficiency and has similar scalability problems.

As a consequence, in one embodiment, weakly atomic safety mechanisms are optimized to be performed when the potential for shared data violations exist. As a specific illustrative example, a Not Accessed Outside Transaction (NAOT) state table is utilized to determine if a transaction accesses shared data that is also accessed outside a transaction. The state table holds references to shared data associated with non-transactional access states. When non-transactional accesses to data are encountered, the non-transactional access state of the NAOT state table is updated appropriately to indicate how shared data is accessed outside a transaction.

Therefore, when a transaction is executing or attempting to commit, in one embodiment, it is decided whether these weakly atomic safety mechanisms are to be performed based on whether shared data is conflictingly accessed, as represented in the state table. For example, if transactionally accessed shared data is not accessed outside the transaction, then the transaction may commit quickly and efficiently without performing a safety mechanism, such as quiescence or acquisition of read locks. However, if the shared data is accessed outside a transaction, then safety mechanism may be performed.

To illustrate, selective quiescence may be utilized, where quiescence, by default, is to be applied at commit of every transaction. Yet, if a transaction does not potentially conflictingly access non-transactional data, then other subsequent transactions do not have to quiesce, i.e. wait, upon the transaction. Essentially, selective quiescence increases overall transaction commit performance by decoupling transactions from quiescence dependency on previous non-ordering transactions, i.e. the quiescent state time of a subsequent transaction is reduced by not having to wait on a previous non-ordering transaction. Optimizing quiescence based on utilization of Not Accessed Outside Transaction (NAOT) analysis to detect non-ordering transactions, i.e. transactions that do not conflictingly access shared data, is described in more detail in an application field herewith having Ser. No. 12/344,143, entitled, "Optimizing Quiescence in a Software Transactional Memory (STM) System."

As another example, selective acquisition of read locks may be applied. Here, if it is determined that a transaction does not potentially conflictingly access non-transactional data, then read locks are not acquired for the transaction. As stated above, to ensure data consistency read locks were acquired for every transaction. Here, if there is no shared data conflict, then the acquisition of read locks is elided, which results in a time savings for the read lock acquisition and potential improvement of transactional performance.

Consequently, optimization of weakly atomic safety mechanisms, in one embodiment, refers to removing safety mechanism overhead from transactions associated with shared data that is not conflictingly accessed outside a transaction. Additionally, optimization of weakly atomic safety mechanisms may also refer to reducing the overhead from transactions to perform safety mechanisms only for data potentially conflictingly accessed outside a transaction.

Figure 3:
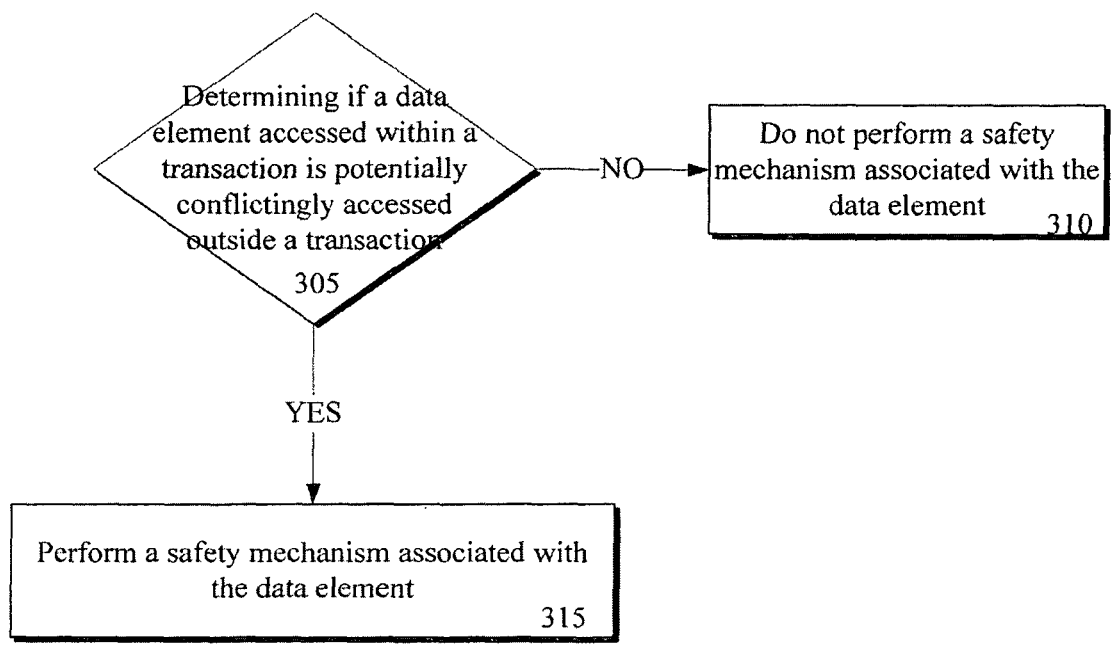
FIG. 3 illustrates an embodiment of a flowchart for a method of optimizing overhead for weakly atomic transactional systems.

Referring next to FIG. 3, an embodiment of a flowchart for a method of providing optimized weak atomicity in transactional systems is illustrated. Note the flowcharts of FIGS. 3-6 are illustrated in a substantially serial fashion. However, the methods illustrated by these Figures are not so limited, as they may occur in any order, as well as being performed at least partially in parallel.

In flow 305, it is determined if a data element accessed within a transaction is potentially conflictingly accessed outside a transaction. Note that conflicting accesses may vary based on implementation. For example, in a dynamic runtime managed environment, a non-transactional read of shared data potentially conflicts with a transactional write to the shared data. Other examples include a non-transactional write to shared data and a transactional read of the share data in a native write-buffering STM.

In one embodiment, a Not Access Outside Transaction (NAOT) state table is utilized to determine if a data element is conflictingly accessed inside and outside of a transaction. As an example, the table includes at least two fields, a data element reference field and a state field associated with the data element. Therefore, when a non-transactional or transactional access is encountered to the data element, an entry is created or updated. For example, if a transactional access to a data element is encountered, then a reference to the data element is stored in the data element reference field of an entry along with a corresponding access state. In one embodiment, by default, it is assumed that the data element is not accessed outside a transaction. So in this example, the state is updated by default to a not-accessed state.

However, subsequently, if a non-transactional access to the data element is encountered, the access state is updated accordingly. In one embodiment, when the non-transactional access includes a non-transactional write, the access state is updated to an accessed state and when the non-transactional access includes a non-transactional read, the access state is updated to a not-written state. Note that the accessed and the not-written states may be referred to as different states in different implementations. In addition, encountering a memory access may occur during runtime, such as during dynamic compilation, or during static/whole program compilation.

If a transaction potentially conflictingly accesses data, then a safety mechanism is performed in flow 315 to ensure isolation from the accesses outside the transaction. In one embodiment, quiescence is applied for every transaction, so in response to a transaction potentially conflictingly accessing non-transactional data, then no action is taken to dissuade subsequent transactions from waiting on the transaction. In another embodiment, read locks are acquired for a read set of the transaction, or a subset of the read set, which are associated with shared data accessed outside the transaction.

Note that a potential advantage exists in an implementation where read locks are acquired from a subset of reads, i.e. the cost of acquiring read locks for all the reads is avoided. Moreover, the read locks may be acquired during an attempted commit of the transaction or within the body of the transaction. For example, in a write-buffering STM, read locks may be acquired during commit, while in an update-in-place STM, read locks may be acquired at the potentially conflicting transactional memory accesses.

Furthermore, if shared data is not conflictingly accessed outside a transaction, then in flow 310 the safety mechanisms are not performed. As an example, in a managed STM system, if shared data items written in a transaction that are not accessed outside the transaction, then read locks are not acquired. As another example, the transaction may be identified as non-ordering, such that subsequent transactions do not wait in a quiescent state upon the non-ordering transaction. As can be seen in these examples, the transaction is able to attempt commit without acquiring read locks or a subsequent transaction is able to commit without performing a quiescent wait upon this transaction, which potentially results in a substantial optimization in execution time. Essentially, when there is no potential for conflict the safety mechanisms are elided to enable more efficient execution of transactions.

Quiescence and read locks have been provided as examples of potential safety mechanisms for privatization, which is optimized in response to shared data being conflictingly accessed. However, any known safety mechanisms, such as mechanism for enforcing publication and granular safety may be optimized in a similar manner.

Figure 4:
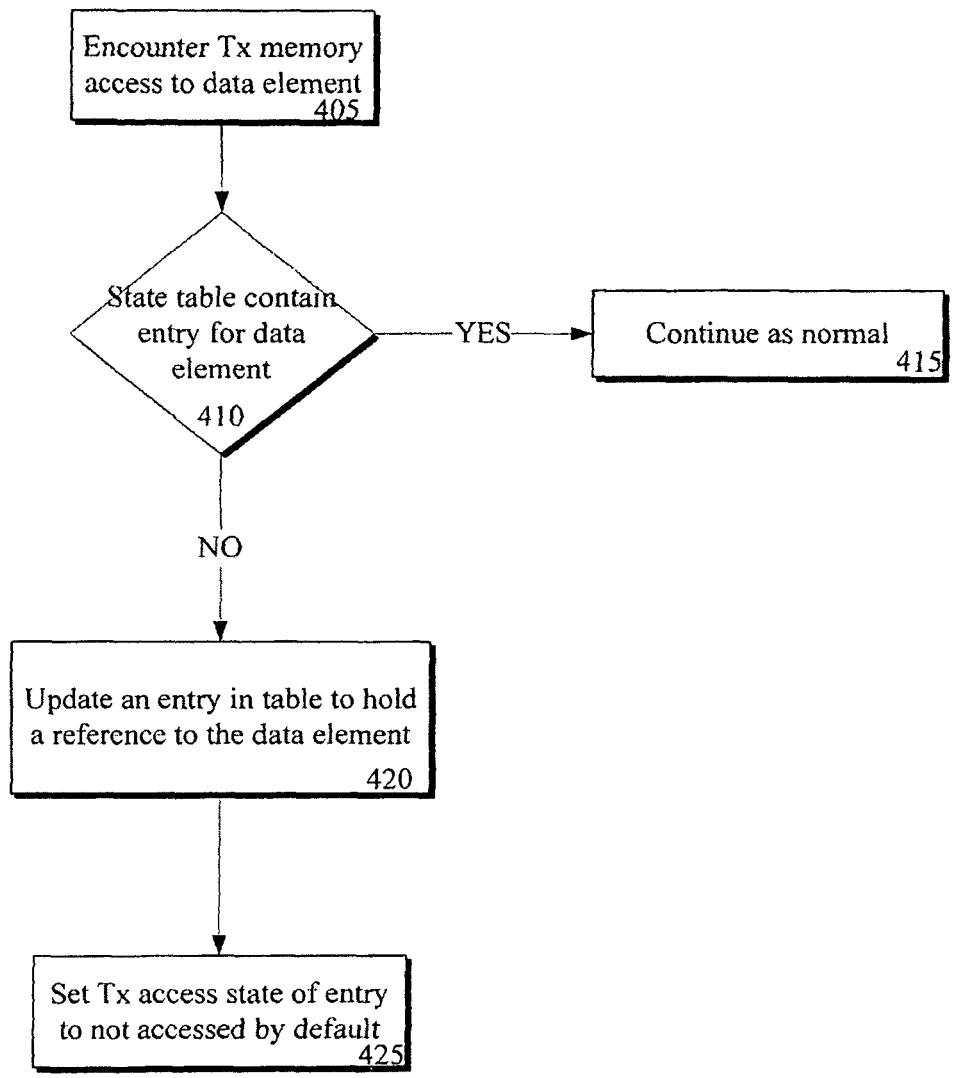
FIG. 4 illustrates an embodiment of a flow chart for a method of maintaining a state table in response to encountering a transactional memory.

Referring next to FIG. 4, an embodiment of a flow diagram for a method of maintaining a state table is illustrated. As mentioned above, a Not-Accessed Outside Transaction (NAOT) state table, in one embodiment, is maintained to determine if shared data is conflictingly accessed outside a transaction. As a first example, the NAOT table is maintained during runtime compilation and/or partial program compilation. As an illustration, a JIT compiler compiles code during runtime "just in time" for execution. Here, the NAOT table is maintained by the JIT compiler or other executing code to determine potential shared data accessed outside a transaction. In another embodiment, the table is maintained during static or whole program compilation. Here, the table is maintained in a similar manner by the compiler or other code to detect shared data conflicts.

In flow 405, a transactional memory access to a data element is encountered. As stated above, the transactional memory access may be encountered during runtime execution or during static execution of program code, such as a compiler. Examples of transactional memory access operations include a transactional load and a transactional store.

In flow 410 it is determined if the NAOT state table already includes an entry for a data element referenced by the transactional memory access operation. In one embodiment, the NAOT state table is indexed utilizing data elements, or references thereto. Examples of data elements, or references thereto, include a data element, a data object, a data reference, a field of a type of dynamic language code, a type of dynamic language code, a memory address to hold data, and a memory location to hold data.

A few of the examples above, such as a field of a type of dynamic language code and a type of dynamic language code refer to data structures of dynamic language code. To illustrate, dynamic language code, such as Java™ from Sun Microsystems, Inc, is a strongly typed language. Each variable has a type that is known at compile time. The types are divided in two categories—primitive types (boolean and numeric, e.g., int, float) and reference types (classes, interfaces and arrays). The values of reference types are references to objects. In Java™, an object, which consists of fields, may be a class instance or an array. Given object a of class A it is customary to use the notation A::x to refer to the field x of type A and a.x to the field x of object a of class A. For example, an expression may be couched as a.x=a.y+a.z. Here, field y and field z are loaded to be added and the result is to be written to field x.

Therefore, indexing of a NAOT state table and conflict determination there from may be performed at any of data level granularity, i.e. the NAOT table may be indexed at any of those data granularities. For example, in one embodiment, the table is indexed at the type level, and as a result conflicting non-transactional accesses are detected at the type level. Here, a transactional write to a field A::x and a non-transactional load of field A::y is determined to be conflictingly accessed. In another embodiment, the NAOT state table is indexed and conflict determination/analysis is performed at a field level granularity. Here, a transactional write to A::x and a non-transactional load of A::y is not determined to be conflicting, as they are separately indexed in the table. Note, other data structures or programming techniques may be taken into account in conflict analysis. As an example, assume that fields x and y of object of class A, i.e. A::x and A::y, point to objects of class B, are initialized to newly allocated objects, and are never written to after initialization. In one embodiment, a transactional write to a field B::z of an object pointed to by A::x is not determined to be a conflicting access in regards to a non-transactional load of field B::z of an object pointed to by A::y.

Regardless, once a data granularity level is selected, the table is indexed by the data elements. Therefore, after encountering the access, a search of the NAOT state table is performed. If an entry for the data element exists, then in flow 415 execution continues normally, such as further execution of compiler code to compile application code. However, if an entry does not exist, then an entry is created in the NAOT state table and updated to hold a reference to the data element in flow 420. Furthermore, the access state field associated with the data field is updated appropriately. In one embodiment, by default, the state field is updated to a not accessed state. In other words, it is assumed by default that the data is not accessed outside the transaction.

Figure 5:
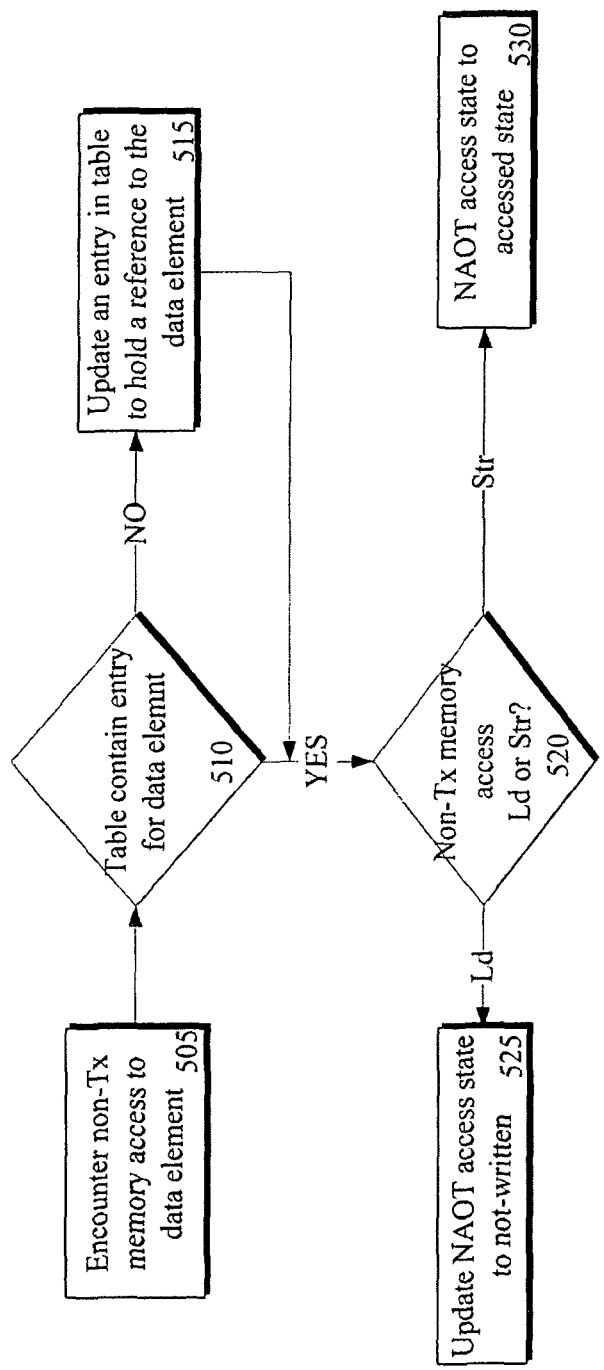
FIG. 5 illustrates an embodiment of a flow chart for a method of maintaining a state table in response to encountering a non-transactional memory access.

Turning to FIG. 5, an embodiment of a flow diagram for a method of further maintaining a state table is illustrated. In flow 505 a non-transactional memory access referencing a data element is encountered. In a similar fashion to the flow in FIG. 4, the NAOT state table is checked/searched to determine if an entry for the data element already exists in flow 510.

In response to the NAOT state table not including an entry for the data element, an entry is created and updated to hold a reference to the data element in flow 515. Therefore, whether an entry exists or one is created in flow 515, then in flow 520 it is determined what type of access the non-transactional operation includes. According to the type of access, the state portion of the entry is updated accordingly. In response to the non-transactional access being a read operation, the NAOT state table entry is updated to hold a not written state. Note that, in one embodiment, the entry is not updated to hold the not-written state if already set to an accessed state. In an example, assume that the NAOT state table is part of a managed write-buffering STM system. Here, the state of interest is when the data element is read or written outside a transaction and the access state includes an "accessed" state. In contrast, the not-written state may be of interest in a native environment.

To illustrate an embodiment of operation of an NAOT state table, the pseudo code below in Pseudo Code A is discussed in reference to included Tables A and B.

Pseudo Code A: Exemplary pseudo code

```
Thread 1
int foo(List list) {
    Item item1;
    atomic { // T1
        item1 = list.first;
        list.first = list.first.next;
    }
    return item1.value;
}
Thread 2
void bar(List list) {
    atomic { // T2
        Item item2 = list.first;
        item2.value++;
    }
}
```

To further the discussion, it is assumed that the pseudo code is to be executed utilizing a Just In Time (JIT) compiler within a managed write-buffering STM. However, the example described below may be extrapolated to maintaining a state table in any execution or transactional memory environment. Assuming the JIT compiler compiles bar before foo, Table A below illustrates an exemplary embodiment of an NAOT state table, or global state table, after bar is compiled.

TABLE A

State table after bar is compiled.

| Field | NOAT State |
| --- | --- |
| List::first | Not-accessed |
| Item::value | Not-accessed |
| Item::next | Not-accessed |

Here, note that the state table includes entries indexed by references to data elements accessed by memory operations within an atomic/transaction section of code in the function bar. In addition, the access state of each of the entries is set by default to the not-accessed state. Essentially, these data elements have not been accessed outside a transaction; therefore, it is assumed they are not accessed outside a transaction until a non-transactional access to the data element is otherwise encountered.

TABLE B

State table after foo is compiled.

| Field | NAOT State |
| --- | --- |
| List::first | Not-accessed |
| Item::value | Not-written |
| Item::next | Not-accessed |

During compilation of the foo function, transactional accesses to some of the listed data elements are once again encountered. However, as inserted barriers provide isolation between transactional accesses, the access state remains in the not-accessed state. Yet, when the non-transactional memory access, i.e. return item1.value, in foo is encountered, then the state table is searched. The previous entry is found and the access state is updated to the "not-written" state.

Therefore, when safety features/mechanisms are optimized, the table indicates that the Item::value data element is accessed outside a transaction. Consequently, when a transaction, such as the transaction in function bar, is executed in a native environment, optimized safety features may be performed. In contrast, if a transaction does not access Item::value, then it may elide the safety mechanisms for better performance. Note in a managed environment, safety mechanisms may be elided for a transaction including Item::value, as the state of interest for a managed environment includes the accessed state, where in a native environment both the accessed and not-written states may be of interest.

Figure 6:
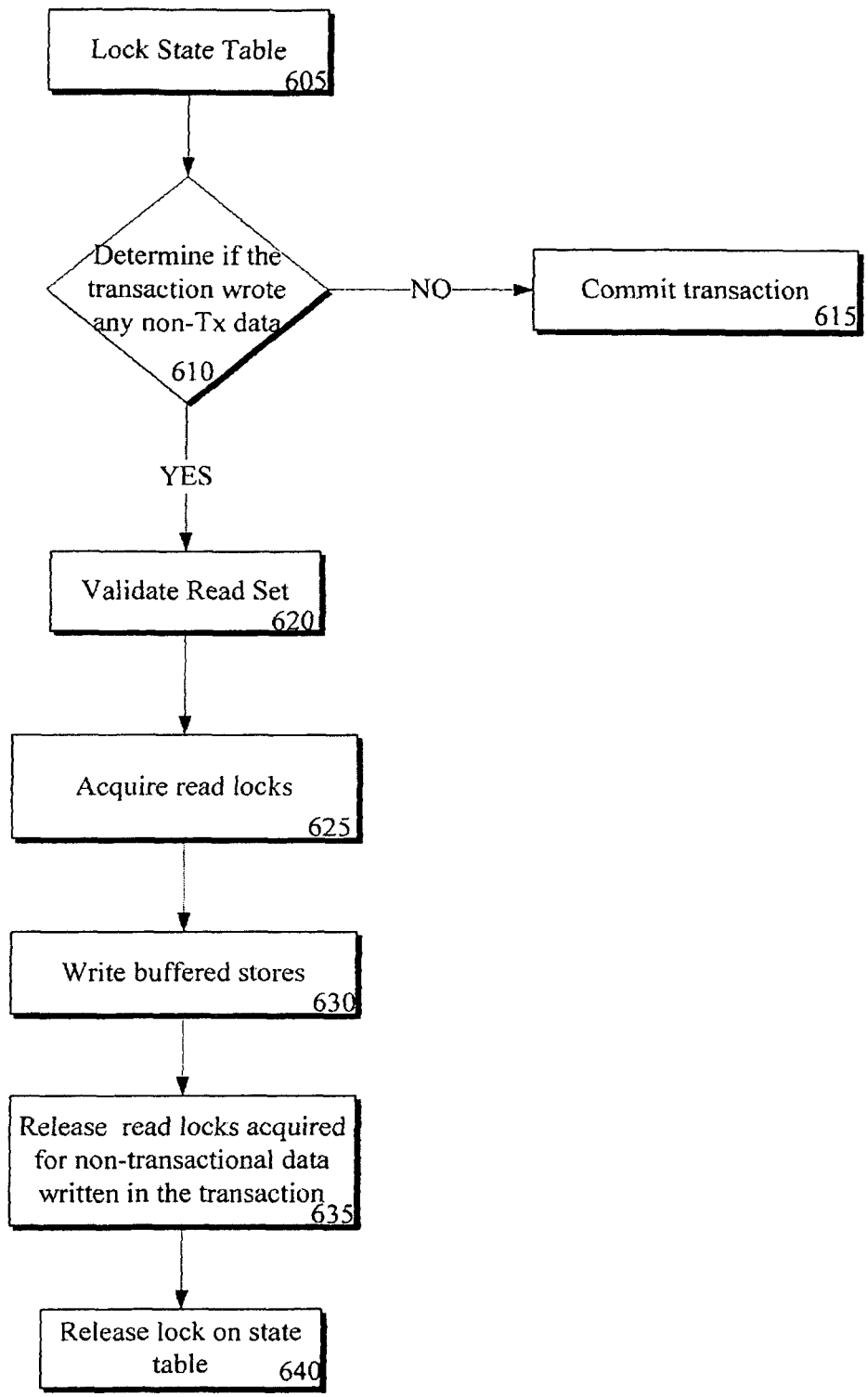
FIG. 6 illustrates an embodiment of a flow diagram for a method of providing optimized privatization safety during an attempted commit of a transaction in a managed environment write-buffering Software Transactional Memory (STM) system.

Turning to FIG. 6, an embodiment of a flow diagram for optimizing weak atomicity safety features during commit of a transaction is illustrated. Again, the discussion of FIG. 6 and included pseudo code is in reference to a transaction attempting to commit in a managed write-buffering STM system. However, similar operations may be performed during execution of the transaction or at commit in any implementation of an STM within a managed or native execution environment. Pseudo code for an embodiment of the flow diagram illustrated in FIG. 6 is included below in Pseudo code B.

| Pseudo Code B: Embodiment of commit sequence utilizing NAOT analysis |
| --- |
| L1    boolean txncommit(TxnDescriptor* desc) { |
|        // Read lock state table |
| L2    lock(state_table, shared); |
| L3    safe = true; |
| L4    for each element in write_buffer { |
| L5      if non_transactionally_accessed(element) |
| L6        safe = false; break; |
|      } |
| L7    for each element in read_set { |
|        // Validate as before |
| L8      if (!validate_read(desc, element)) { |
| L9        if (!safe) |
| L10          release_all_read_locks(desc); |
| L11        unlock(state_table); |
| L12        return false; |
|      } |
|        // Acquire read locks if written non-transactional data |
| L13      if (!safe) |
| L14        acquire_read_lock(element); |
|      } |
|      // Write buffered stores |
| L15    publish_stores(desc); |
| L16    release_locks(desc); |
| L17    if (!safe) |
| L18      release_all_read_locks(desc); |
|      // Release read lock on state table |
| L19    unlock(state_table); |
| } |

In flow 605, a state table, such as the NAOT state table described in reference to FIGS. 4-5, is locked (L2). In one embodiment, where a dynamic compiler, such as a JIT compiler, is utilized, the state table is locked to ensure the dynamic compiler is not modifying states in the table before a transaction completes. Alternatively, during static compilation, a lock may not be acquired for the state table based on design implementation.

In flow 610 it is determined if the transaction attempting to commit has written any non-transactional data (L4-L5). In one embodiment, the non_transactionally_accessed function checks a state table to see if an entry exists for data elements in the write buffer, i.e. data elements written during the transaction. If an entry exists, then the corresponding access state is checked. From above in Table B, the only data element in an "accessed" or "not-written" state is Item::value. Therefore, if the transaction did not write Item::value, then in flow 615 the transaction commits as normal, i.e. it is determined that the transaction did not write any non-transactionally accessed data. Commit as normal may include other illustrated commit operations/functions, such as validating the read set in flow 620. However, other safety mechanisms may be omitted, such as quiescence or acquiring of read locks.

In regards to the Pseudo Code B, if no data element written to during the transaction is non-transactionally accessed, then the "safe" variable remains true from L3, i.e. not set to false in L6, and no read locks are acquired in L13-L14, since safe is still True. As a result, the transaction is able to be executed and committed without quiescence or acquiring read locks resulting in optimized execution efficiency. Note that in alternate environments, such as a native execution environment, it may also be determined if the transaction read any data written outside of the transaction. Here, a similar determination may be made utilizing a global state table with regard to the transaction's read set in a similar manner to the illustrated use of the write set.

However, if it is determined that the transaction wrote non-transactional data, then the commit process is continued with potentially optimized safety mechanisms. In the illustrated example, the read set for the transaction is validated in flow 620. In regards pseudo code B, if a read in the read set is not valid (L8), then read locks are released for read data accessed outside the transaction (L9-L10), the global state table is unlocked (L11), and the commit process returns false (L12), i.e. an abort of the transaction may be performed.

In flow 625, if the transaction wrote any data that is potentially conflictingly accessed outside the transaction, then read locks are acquired for the read set of the transaction. As stated above, in different environments and STM implementations conflicting accesses may include different combinations of transactional and non-transactional loads and stores to the data. In the pseudo code example, each entry of the read set is examined and if a data element of a read entry has been written to in the transaction and non-transactionally accessed, then a read lock is acquired (L7 &L13-L14). As a result, safety mechanisms, such as acquiring read locks, in one embodiment, are selectively performed for transactions that potentially conflictingly access non-transactionally. Alternatively, a selective quiescence mechanism may be employed to optimize quiescence.

After the proper read locks are acquired in flow 625, the buffered stores are performed in flow 630, i.e. written to the corresponding memory locations for global observation (L15-L16). Once again, this implementation assumes a write buffering STM. In contrast, in a update-in-place STM, writes may be performed to the memory locations and not made globally visible until commit. In an update-in-place STM, as one example, read locks are acquired at the transactional access, such as immediately preceding the transactional access. In addition, the acquired read locks and the lock of the global state table are released in flows 635 and 640 (L17-L19).

Therefore, as can be seen from above, instead of previous systems, such as strong atomic systems incurring expensive overhead at non-transactional operations, a weak atomic system with quiescence for every transaction, with read lock acquisition at every transactional read, or with unsafe semantics, the methods and apparatus described herein provides for an optimized weak atomic STM for efficient execution of transactional and non-transactional operations with minimum safety mechanism overhead. As a result, safety mechanisms for a transaction may be severely reduced and even eliminated, when data accessed in the transaction is not conflictingly accessed outside the transaction. Furthermore, even when a potential conflict exists, safety mechanisms may still be optimized, i.e. performed only for transactions in which operations access shared data that potentially conflicts with accesses outside the transaction. Moreover, the optimization may be incorporated during whole program analysis in a static environment or within a dynamic environment through similar usage of a global state table, such as a Not Accessed Outside Transaction (NAOT) table.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A non-transitory machine readable medium including program code which, when executed by a machine, causes the machine to:

determine, before execution of a transactional access to a particular data element, determine whether a potential conflict exists between the transitional access of the particular data element and a non-transitional access of the particular data element; to be accessed within a transaction is to be potentially conflictingly accessed outside the transaction based on an entry of a state table for the data, wherein the entry of the state of the table is to hold a reference to the data for a non-transactional access state and includes a data element reference field and a state field associated with the data element; and if a potential conflict exists, perform a safety mechanism for the transactional access, wherein the safety mechanism is selected from a group consisting of a privatization safety mechanism, a publication safety mechanism, and a granular safety mechanism; and if a potential conflict does not exists, elide the safety mechanism for the transactional access in response to determining the particular data element is to be potentially conflictingly accessed outside the transaction.

2. The machine readable medium of claim 1, wherein the safety mechanism includes an identification of the transaction as non-conflicting to optimize quiescence of a subsequent transaction upon the transaction.

3. The machine readable medium of claim 1, wherein the safety mechanism includes acquiring a read lock for the data element in response to the data element to be accessed within the transaction includes the data element to be read within the transaction.

4. The machine readable medium of claim 1, wherein determining whether the potential conflict exists between the transitional access of the particular data element and the non-transitional access of the particular data element determining if the particular data element to be accessed within a transaction is to be potentially conflictingly accessed outside the transaction comprises determining the data element is to be written within the transaction and to be accessed outside the transaction.

5. The machine readable medium of claim 4, wherein determining the data element is to be written within the transaction and to be accessed outside the transaction comprises:

determining the transaction includes a write to the particular data element; and determining an entry of a global Not Accessed Outside Transaction (NAOT) state table includes an entry for the particular data element, and the entry holds an accessed state value indicating the particular data element is to be accessed outside the transaction.

6. The machine readable medium of claim 4, wherein determining whether the potential conflict exists between the transitional access of the particular data element and the non-transitional access of the particular data element determining if the particular data element to be accessed within a transaction is to be potentially conflictingly accessed outside the transaction further comprises determining the particular data element is to be read within the transaction and to be written outside the transaction.

7. The machine readable medium of claim 1, wherein the particular data element is selected from a group consisting of a data object, a field of a type of dynamic language code, a type of dynamic language code, and a default cache line amount of data.

8. The machine readable medium of claim 1, wherein determining whether the potential conflict exists between the transitional access of the particular data element and the non-transitional access of the particular data element determining if the particular data element to be accessed within a transaction is to be potentially conflictingly accessed outside the transaction is be statically determined during whole program compilation.

9. The machine readable medium of claim 1, wherein the program code includes compiler code, when executed by the machine, to determine whether the potential conflict exists between the transitional access of the particular data element and the non-transitional access of the particular data element, if a data element to be accessed within a transaction is to be potentially conflictingly accessed outside the transaction, and wherein the program code further includes transactional runtime library code, when executed by the machine, to elide the safety mechanism for the transaction when a conflict does not exist.

10. The machine readable medium of claim 9, wherein transactional runtime library code, comprises a conditional operation within a commit function, when executed by the machine, to perform the operations of eliding a safety mechanism for the transaction in response to determining when a conflict does not exist.

11. A non-transitory machine readable medium including program code which, when executed by a machine, causes the machine to:
  compile application code;
  maintain a state table during the compiling of the application code and before execution of a non-transactional access to access a particular data element, the state table to hold a non-transactional access state to correspond to each of a plurality of accessed data elements and includes a data element reference field and a state field associated with the data element;
  determine when the particular data element of the plurality of data elements is to be accessed outside a transaction based on a non-transactional access state to correspond to the particular data element to be held in the state table;
  performing a weak atomic safety mechanism in response to determining the data for the transactional memory access operation within the transaction is to be conflictingly accessed outside the transaction, wherein the weak atomic safety mechanism is selected from a group consisting of a privatization safety mechanism, a publication safety mechanism, and a granular safety mechanism; and
  not performing the weak atomic safety mechanism in response to determining the data for the transactional memory access operation within the transaction is not to be conflictingly accessed outside the transaction.

12. The non-transitory machine readable medium of claim 11, wherein the machine to maintain the state table comprises the machine to update an entry in the state table to hold a reference to the particular data element corresponding to a default not accessed state in response to encountering a transactional access to the particular data element during compiling the application code.

13. The non-transitory machine readable medium of claim 12, wherein the machine to maintain the state table further comprises the machine to update the entry in the state table to hold an accessed state in response to encountering a non-transactional access to the particular data element during compiling the application code.

14. The non-transitory machine readable medium of claim 12, wherein the machine to maintain the state table further comprises the machine to update the entry in the state table to hold an accessed state in response to encountering a non-transactional write operation to the particular data element during compiling the application code, and updating the entry in the state table to hold a not-written state in response to encountering a non-transactional read operation to the particular data element during compiling the application code and the entry not already holding the accessed state.

15. The non-transitory machine readable medium of claim 11, wherein the program code includes dynamic compiler code to compile the application code dynamically.

16. The non-transitory machine readable medium of claim 11, wherein the program code includes static compiler code to compile the application code statically.

17. A non-transitory machine readable medium including program code which, when executed by a machine, causes the machine to perform the operations of:
  determining a first data element for a write within a transaction is to be non-transactionally accessed based on an entry of a state table for the data, wherein the entry of the state of the table is to hold a reference to the data for a non-transactional access state and includes a data element reference field and a state field associated with the data element;
  eliding a safety mechanism for a second data element for a read within the transaction in response to determining the data element for the write within the transaction is not to be non-transactionally accessed, wherein the safety mechanism is selected from a group consisting of a read lock, a privatization safety mechanism, a publication safety mechanism, and a granular safety mechanism; and
  acquiring said safety mechanism for a second data element for a read within the transaction in response to determining the data element for the write within the transaction is to be non-transactionally accessed.

18. The machine readable medium of claim 17, wherein acquiring said safety mechanism for the second data element is performed at the read within the transaction in response to the transaction to be executed within an update-in-place software transactional memory system.

19. The machine readable medium of claim 17, wherein acquiring said safety mechanism for the second data element is performed during an attempted commit of the transaction in response to the transaction to be executed within a write-buffering software transactional memory system.

20. The machine readable medium of claim 17, wherein determining a first data element for a write within a transaction is to be non-transactionally accessed comprises:

determining an entry of a Not Accessed Outside Transaction (NAOT) state table for the date element;
determining an access state held in the entry; and
determining the data element for the write within the transaction is to be non-transactionally accessed in response to the access state indicating a non-transactional access from the data element.

21. A system comprising:
a non-transitory machine readable medium including application code and compiler code, the compiler code, when executed, to
compile at least a portion of the application code for execution with a processor, and
maintain a state table during compilation of the portion of application code to indicate when shared data accessed within a transaction of the portion of application code is potentially conflictingly accessed non-transactionally, said state table including a plurality of entries, wherein an entry in said state table is to hold a reference to the data for a non-transactional access state and includes a data element reference field and a state field associated with the data element;
wherein the processor is to execute the compiler code and the transaction of the application code;
wherein the processor is to not execute safety mechanism code for the transaction in response to the state table indicating the shared data accessed within the transaction is not potentially conflictingly accessed non-transactionally; and
wherein the processor is to perform a safety mechanism in response to determining the data for the transactional memory access operation within the transaction is to be conflictingly accessed outside the transaction, wherein the safety mechanism is selected from a group consisting of a read lock, a privatization safety mechanism, a publication safety mechanism, and a granular safety mechanism.

22. The system of claim 21, wherein the safety mechanism code is included in a commit function within a transactional runtime library to be called in response to execution of a call to the commit function inserted in the portion of the application code during execution of the compiler code to compile the portion of the application code.

23. The system of claim 21, wherein the safety mechanism code includes quiescence code, when executed, to identify the transaction as non-ordering, such that subsequent transactions executing the quiescence code do not quiesce upon the transaction.

24. The system of claim 21, wherein the safety mechanism code includes read lock acquire code, when executed, to acquire read locks for shared data read within the transaction.

25. A method comprising:
determining when data for a transactional memory access operation within a transaction is to be conflictingly accessed outside the transaction based on an entry of a state table for the data, wherein the entry of the state of the table is to hold a reference to the data for a non-transactional access state and includes a data element reference field and a state field associated with the data element;
performing a weak atomic safety mechanism in response to determining the data for the transactional memory access operation within the transaction is to be conflictingly accessed outside the transaction, wherein the weak atomic safety mechanism is selected from a group consisting of a privatization safety mechanism, a publication safety mechanism, and a granular safety mechanism; and
not performing the weak atomic safety mechanism in response to determining the data for the transactional memory access operation within the transaction is not to be conflictingly accessed outside the transaction.

26. The method of claim 25, wherein determining the data for the transactional memory access operation within the transaction is to be conflictingly accessed outside the transaction comprises determining the transactional memory access operation includes a store operation and the non-transactional access state indicates a non-transactional access to the data.

27. The method of claim 25, wherein determining the data for the transactional memory access operation within the transaction is to be conflictingly accessed outside the transaction further comprises determining the transactional memory access operation includes a read operation and the non-transactional access state indicates a non-transactional write to the data.

* * * * *